(12) United States Patent
Baptist

(10) Patent No.: US 6,475,257 B1
(45) Date of Patent: Nov. 5, 2002

(54) METHOD OF IMPROVING PLANT GROWTH

(76) Inventor: James N. Baptist, 2620 Lake Victoria, El Paso, TX (US) 79936

( * ) Notice: Subject to any disclaimer, the term of this patent is extended or adjusted under 35 U.S.C. 154(b) by 0 days.

(21) Appl. No.: 09/953,955

(22) Filed: Sep. 18, 2001

(51) Int. Cl.[7] .......................... C05F 11/08; C05F 15/00
(52) U.S. Cl. ...................................... 71/6; 71/25; 71/27
(58) Field of Search .................................. 71/6, 27, 25

(56) References Cited

U.S. PATENT DOCUMENTS

| | | | | |
|---|---|---|---|---|
| 3,764,294 A | * | 10/1973 | Miller | 71/122 |
| 3,915,686 A | * | 10/1975 | Miller | 71/29 |
| 3,922,977 A | | 12/1975 | Lavo et al. | 111/1 |
| 4,240,817 A | | 12/1980 | Takizawa et al. | 71/29 |
| 4,343,646 A | * | 8/1982 | Leonard | 71/25 |
| 4,576,626 A | | 3/1986 | Bauer et al. | 71/28 |
| 4,743,288 A | | 5/1988 | Hirsbrunner | 71/28 |
| 4,840,660 A | | 6/1989 | Kowite et al. | 71/86 |
| 5,549,729 A | * | 8/1996 | Yamashita | 71/26 |
| 5,597,400 A | * | 1/1997 | Nonomura et al. | 71/28 |
| 5,776,224 A | * | 7/1998 | Trautmann et al. | 71/1 |
| 5,807,604 A | | 9/1998 | Dokkestul et al. | 427/4 |
| 5,885,931 A | | 3/1999 | Rogiers et al. | 504/101 |

FOREIGN PATENT DOCUMENTS

| | | | |
|---|---|---|---|
| GB | 907834 | | 10/1962 |
| JP | 62220114 | * | 9/1987 |
| JP | 2000312531 | * | 11/2000 |

* cited by examiner

*Primary Examiner*—Chhaya D. Sayala
(74) *Attorney, Agent, or Firm*—Richard C. Litman

(57) ABSTRACT

A method of improving plant growth by providing controlled amounts of precursor solutions of either new or used ethylene glycol (antifreeze), an emulsified used motor oil, other biodegradable material to the soil to produce carbon dioxide by the action of soil microorganisms. Also, shredded paper can be added to the soil.

8 Claims, No Drawings

METHOD OF IMPROVING PLANT GROWTH

BACKGROUND OF THE INVENTION

1. Field of the Invention

The present invention relates generally to plant growth. More specifically, the invention is a method for improving plant growth by adding controlled amounts of biodegradable materials to produce carbon dioxide by the action of soil microorganisms. Examples of such materials are: methanol, ethanol, N-propanol, isopropanol, acetone, ethyl acetate, ethylene glycol, propylene glycol, sugars, emulsified oil, or shredded paper.

2. Description of the Related Art

The related art of interest describes various nutrients for plant growth, but none discloses the present invention. There is an ergonomic need for economical or waste materials which can increase growth of plants and trees by addition to the soil of a material such as commercial ethylene glycol solution, used radiator coolant, or engine motor oil. These substances are acted upon by microorganisms inherently present in the soil to produce carbon dioxide which enhances the growth of the plants.

The related art will be discussed in the order of relevance to the present invention.

U.S. Pat. No. 4,743,288 issued on May 10, 1988, to Pierre Hirsbrunner describes a process for treating soil by adding an aqueous solution of a urea-formaldehyde based precondensate containing a polysaccharide such alginic acid, alginate, low methoxyl pectin, gum karaya, and gum arabic capable of forming a gel with calcium ions in the soil for improved erosion resistance. The process for treating soil is distinguishable for requiring urea-formaldehyde and gel forming organic substances to combine with calcium in the soil.

U.S. Pat. No. 4,840,660 issued on Jun. 20, 1989, to William J. Kowite et al. describes plant growth regulator dispersions comprising aqueous phosphonic acid dispersed in oil for spraying by ultra-low volume spray apparatus. The composition comprises 10–50 wt. % 2-chloroethylphosphonic acid, 20–60 wt. % hydrocarbon oil (paraffin, isoparaffin, benzene, alkylbenzene, fatty acid, tall oil, palm oil, cottonseed oil, soybean oil, peanut oil, castor oil, lanolin, and mixtures thereof), 5–25 wt. % water, and 10–40 wt. % hydrophobic surfactant containing less than twenty moles of ethylene oxide per mole of alcohol or phenol. The dispersions are distinguishable for requiring phosphonic acid dispersions.

U.S. Pat. No. 4,576,626 issued on Mar. 18, 1986, to Kurt H. Bauer et al. describes a process for preparation of foliage fertilizer suspension compositions comprising 10–50 wt. % phospholipids and solvents such as ethylene glycol and ethanol. The process is distinguishable for requiring phospholipids.

U.S. Pat. No. 4,240,817 issued on Dec. 23, 1980, to Iwao Takizawa et al. describes a water absorbable urea resin foam mat which contains alkylene glycols and inorganic salts which is effective for raising rice crop seedlings. Ethylene glycol and numerous inorganic salts are described as being advantageous. The urea resin foam mat composition is distinguishable for requiring the foam mat.

U.S. Pat. No. 5,807,604 issued on Sep. 15, 1998, to Jeffrey L. Dokkestul et al. describes a method for manufacturing long-lasting decorative foliage by infusion of an aqueous ethylene glycol solution of tartrazine yellow dye containing 0.1–1.6 grams per liter dissolved carbon dioxide, and, optionally, a potassium salt. After removal of excess solution, a topical water-based organic sealant is applied. The method is distinguishable for preserving foliage.

U.S. Pat. No. 5,885,931 issued on Mar. 23, 1999, to Lodewijk M. Rogers et al. describes a compatibility agent composition for a liquid fertilizer-toxicant mixture used in pesticide formulations having a high flash point, liquid at temperatures below 0° C. and its properties do not change after being stored for one week at 40° C. The composition contains a glycoside, an ethoxylated alkylamine, a polyoxyalkylene alkylphenol phosphoric acid ester, 5–20 wt. % propylene glycol and, optionally, 5–40 wt. % water. The composition is distinguishable for use in pesticide formulations and containing glycosides, etc.

U.K. Patent Application No. 907,834 published on Oct. 10, 1962, for Merck & Co., Inc. describes a granular water-soluble plant growth stimulant composition comprising potassium gibberellate having a surface-active agent of polyethylene glycol in the amount of 10 parts by weight. The composition and method of use is distinguishable for requiring potassium gibberellate.

None of the above inventions and patents, taken either singularly or in combination, is seen to describe the instant invention as claimed. Thus, a method of improving plant growth with either new or used solutions of ethylene glycol, sugar or ethanol is desired.

SUMMARY OF THE INVENTION

The present invention is directed to a method of improving plant growth by adding a nutrient solution to the soil. Many plants grow well in a hydroponic system involving inorganic minerals in aqueous solution. However, experienced gardeners recommend that garden soil should be improved by the addition of organic substances, and these additives often contain very little of the inorganic elements which plants need. Some examples are peat, leaf mold, and even sawdust. Several reasons have been suggested for the beneficial effect of organic substances. These organic substances improve the physical properties of the soil, enable the soil to hold more water and supply vitamins.

However, another advantage is that plants are able to use carbon dioxide from the soil. Soil gasses contain far more carbon dioxide than the atmosphere, and lack of carbon dioxide sometimes limits plant growth.

An enzymatic process exists which is able to incorporate carbon dioxide into organic substances in the dark. This process is used by succulent plants to take in carbon dioxide at night when temperatures are lower, and thus the loss of water is less than during daytime. This evening process is based on the enzyme, phosphoenol pyruvate carboxylase, which produces a four-carbon acid, oxaloacetic acid. In the following daytime, the process is reversed, and the carbon dioxide is used in the photosynthesis process to produce sugar and release oxygen.

It is my belief that the same aforementioned enzyme system can occur in the plant roots. Sugars from the leaves would be carried to the roots where the process of glycolysis would yield phosphoenol pyruvate. The carboxylase reaction would then produce oxaloacetic acid or related acids. These substances would then be transported to the leaves.

If a plant relies heavily on the above process as its source of carbon dioxide, its leaves may be wax covered and glossy, like those of many house plants.

House plants are initially potted in soil containing organic material, but this material is used up by soil microorganisms as time passes. It is often inconvenient to repot the plant every year or less. However, a small amount of a biodegradable compound dissolved in water could be added periodically to supply a continuous source of carbon dioxide to the soil. When planting a bush or tree outdoors, a gardener will usually mix organic material into the soil. However, this material will be used up in time as explained above, and there appears to be no way to add more organic material to the soil without disturbing the root system. Again, a water soluble material could be added periodically to generate a regular supply of carbon dioxide to the root zone.

A wide variety of organic compounds, both synthetic and naturally occurring, can be oxidized to carbon dioxide by soil microorganisms. Of special interest for soil-based plants and trees are: used anti-freeze; and used engine motor oil which can be emulsified with a soap or detergent solution. In a second embodiment for aquatic plants which take up carbon dioxide by air tubes passing from the roots to the leaves, and conduct oxygen from the leaves to the roots, an ethylene glycol solution is the preferred additive, because pond soil may be limited in oxygen content.

It is known that used ethylene glycol coolant and engine oil are considered contaminants hazardous to animals, and should not be indiscriminately discarded, but when added to soil in small controlled amounts these materials will be acted upon by the bacteria present in the soil to decompose and liberate useful carbon dioxide for promoting plant and tree growth.

Accordingly, it is a principal object of the invention to provide a nutrient solution for supplying plants and trees with carbon dioxide in the soil.

It is another object of the invention to provide a nutrient solution containing ethylene glycol to plants and trees.

It is a further object of the invention to provide shredded paper or a nutrient solution containing ethylene glycol to house plants.

Still another object of the invention is to provide either commercial anti-freeze solution (pure or used radiator coolant) emulsified used engine oil, or other biodegradable materials to plants or trees.

It is an object of the invention to provide improved elements and arrangements thereof for the purposes described which is inexpensive, dependable and fully effective in accomplishing its intended purposes.

These and other objects of the present invention will become readily apparent upon further review of the following specification.

DETAILED DESCRIPTION OF THE PREFERRED EMBODIMENTS

The present invention is directed to a method of improving plant or tree growth by utilizing controlled amounts of a biodegradable material such as methanol, ethanol, N-propanol, isopropanol, acetone, ethyl acetate, ethylene glycol (new or used), propylene glycol, any sugar, shredded paper, or emulsified motor oil.

The following examples limited to ethylene glycol and exhaled breath demonstrate the value of adding carbon dioxide to the soil as a nutrient.

EXAMPLE 1

*Cyperus alternifolium* is a swamp plant which is also used as a house plant. A plant was divided into parts with 3 to 5 leaves each. These plants were potted in washed sand in 6-inch diameter pots and used in the test described below. Each pot was initially treated with an ethylene glycol enrichment culture. Then ethylene glycol was included in the mineral solution where indicated. Mineral solution, i.e., Peters Plant Food®, was added every two days.

| Plant No. | Treatment       | Initial Wt. | Final Wt. | Growth (120 days) |
|-----------|-----------------|-------------|-----------|-------------------|
| 1.        | Ethylene glycol | 25.9 gm.    | 70.7 gm.  | 2.7 fold          |
| 2.        | Control         | 22.0 gm.    | 22.0 gm.  | none              |
| 3.        | Paper shreds    | 15.2 gm.    | 47.7 gm.  | 3.1 fold          |
| 4.        | Paper shreds    | 29.7 gm.    | 92.9 gm.  | 3.1 fold          |
| 5.        | Ethylene glycol | 20.5 gm.    | 68.2 gm.  | 3.3 fold          |

0.04 ml. of ethylene glycol was added every two days. Shredded paper was initially added as 18 gm. to plant no. 3 and 40 gm. in plant no. 4.

EXAMPLE 2

Four jars were set up with a washed nylon netting and a solution of Peters Plant Food. A leaf of *Cyperus alternifolium* was placed in each jar, which was placed under a neon lamp. Each plant had roots after 28 days. Then carbon dioxide was added daily by blowing exhaled air into each jar. At the end of 70 days, the pH of each jar solution was tested with a conventional garden-type meter. The pH readings ranged from 7.0 to 7.2. The plants were removed and weighed to show any increase in weight.

| Plant No. | Treatment      | Initial Wt. | Final Wt. | Growth (70 days) |
|-----------|----------------|-------------|-----------|------------------|
| 1.        | Carbon dioxide | 0.6 gm.     | 11.8 gm.  | 19.7 fold        |
| 2.        | Control        | 0.7 gm.     | 4.5 gm.   | 6.4 fold         |
| 3.        | Carbon dioxide | 0.8 gm.     | 14.2 gm.  | 17.8 fold        |
| 4.        | Control        | 0.8 gm.     | 1.2 gm.   | 1.5 fold         |

EXAMPLE 3

Aloe vera plants were grown in washed sand in 6-inch pots under a neon lamp. Each pot was inoculated with an ethylene glycol enrichment culture. Then a mineral solution, i.e., Peters Plant Food, was added every five days. 0.04 ml. ethylene glycol in the form of a commercial antifreeze composition for vehicles radiators and the like was added to the test plants every five days. The plants were weighed after 130 days.

| Plant No. | Treatment       | Initial Wt. | Final Wt.  | Growth (130 days) |
|-----------|-----------------|-------------|------------|-------------------|
| 1.        | Ethylene glycol | 11.2 gm.    | 36.8 gm.   | 3.3 fold          |
| 2.        | Control         | 49.2 gm.    | 80.7 gm.   | 1.6 fold          |
| 3.        | Ethylene glycol | 69.7 gm.    | 166.4 gm.  | 2.4 fold          |
| 4.        | Control         | 75.4 gm.    | 121.6 gm.  | 1.6 fold          |

EXAMPLE 4

Rooted cuttings from a Sanseveria plant were treated as in Example 3 for 65 days.

| Plant No. | Treatment | Initial Wt. | Final Wt. | Growth (130 days) |
|---|---|---|---|---|
| 1. | Ethylene glycol | 26.9 gm. | 41.3 gm. | 1.53 fold |
| 2. | Control | 18.3 gm. | 18.9 gm. | 1.03 fold |
| 3. | Ethylene glycol | 10.7 gm. | 15.3 gm. | 1.43 fold |
| 4. | Control | 24.3 gm. | 30.5 gm. | 1.26 fold |

EXAMPLE 5

Several dosage levels of ethylene glycol, i.e., one dose, two doses, and 4 doses, were tested on aloe vera plants under conditions as in Example 3. One dose consisted of 0.02 ml. of ethylene glycol. The dosages were added to the plants every five days.

Results after 133 days were as follows:

| Plant No. | Dose(s) | Initial Wt. | Final Wt. | Growth |
|---|---|---|---|---|
| 1. | 1 | 56.3 gm. | 64.1 gm. | 1.14 fold |
| 2. | 2 | 45.0 gm. | 72.0 gm. | 1.6 fold |
| 3. | 4 | 60.4 gm. | 74.9 gm. | 1.24 fold |
| 4. | Control | 36.7 gm. | 38.8 gm. | 1.06 fold |

These examples show that the periodic addition of small amounts of ethylene glycol can improve the growth of at least three plant species when all other conditions are optimal.

Other biodegradable organic compounds, such as sugars, e.g., lactose, raffinose, galactose, rhamnose, maltose, xylose, glucose, sucrose, and fructose, and alcohols, e.g., methanol, ethanol, and isopropanol, also benefit plant growth based on these examples. However, caution is advised in the amounts of sugar or ethanol added, or in the frequency of addition to the soil, because soil microorganisms are known to readily convert sugars and ethanol to lactic acid or acetic acid which would damage the plant if suddenly flooded with excessive amounts. Safe amounts of sugars and alcohols depend on the specific mixture of microorganisms actually present and the soil pH, among other factors.

Thus, it has been shown by specific examples that the addition of ethylene glycol to the soil by itself can greatly improve plant growth. Similarly, other sources of ethylene glycol such as used antifreeze coolant can be ergonomically utilized for plant growth and decrease the need for recycling of coolant. Another useful source of material is used and emulsified engine motor oil. The other plant growth additives disclosed are expected to supply the carbon dioxide in the soil by the action of soil microorganisms already inherently present. A caveat here would involve careful additions of ethanol and sugars to the soil as mentioned above to minimize any damage to the plants. In addition shredded paper can be added to the soil.

It is to be understood that the present invention is not limited to the embodiments described above, but encompasses any and all embodiments within the scope of the following claims.

I claim:

1. A method of supplying carbon dioxide for the roots of plants and trees for improving growth thereof comprising:

providing a solution of an additive selected from the group consisting of acetone, ethyl acetate, a glycol, used antifreeze, and emulsified used engine motor oil; and adding portions of the additive in predetermined amounts periodically to the soil and the root system supporting a plant or tree;

whereby plant and tree growth is enhanced by the production of carbon dioxide in the soil over an extended period.

2. The method according to claim 1, wherein the glycol additive is ethylene glycol.

3. The method according to claim 2, wherein the glycol additive is used antifreeze.

4. The method according to claim 1, wherein the glycol additive is propylene glycol.

5. The method according to claim 1, wherein the additive is used engine motor oil.

6. The method according to claim 5, wherein the method further comprises the step of emulsifying used motor oil with soap.

7. The method according to claim 5, wherein the method further comprises the step of emulsifying used motor oil with detergent.

8. The method according to claim 1, further comprising the step of adding shredded paper to the soil.

* * * * *